3,669,657
COATING COMPOSITIONS AND METHODS
AND ARTICLES
Dolor N. Adams, Cleveland Heights, and Donald L. Fauser, Lakewood, Ohio, assignors to Harris-Intertype Corporation, Cleveland, Ohio
No Drawing. Continuation-in-part of applications Ser. No. 640,352, 640,353, 640,354, 640,355, all Feb. 15, 1957. This application Mar. 29, 1969, Ser. No. 18,230
The portion of the term of the patent subsequent to Oct. 7, 1986, has been disclaimed
Int. Cl. G03g 5/08
U.S. Cl. 96—1.8
26 Claims

ABSTRACT OF THE DISCLOSURE

Coating materials are disclosed for imparting desired surface characteristics to a variety of articles. The coating materials are applied from a water solution of the resinous binding agent containing discrete solid particles of water insoluble inorganic material.

This invention relates to coating compositions for application to the surface of a variety of articles for achieving thereon various useful surface characteristics in accordance with the use or purpose for which the article as coated is designed or desired and, more particularly, to the application of a coating formed as a matrix of discrete solid particles in a resinous binder from a water solution of the binder so that certain controlled and desired electrical, photosensitive, hydrophilic, water insolubility, protective, decorative, or other surface characteristics are obtained from the coating as applied and dried on the articles. This application is a continuation-in-part of applicants' co-pending applications Serial Nos. 640,352, 640,353, 640,354, and 640,355, all filed February 15, 1957 and all now abandoned.

As disclosed in said copending applications (and as pointed out more particularly below), the coating compositions and methods and articles or products hereof have particular relation to the graphic arts and other fields in which it is desired to impart various specific surface characteristics to a coated article in accordance with the use to which the article as coated is to be applied. Thus, coatings in accordance herewith may be formulated or applied, all from water solutions, to impart to the surface being coated (whether it be paper or metal or other material) such characteristics as electrostatic properties useful in electrophotography, hydrophilic and water insolubility properties useful in lithography, water insolubility and heat-resistant and erosion-resistant properties useful in a protective or decorative coating, and other properties. Hence, coatings in accordance herewith find enhanced utility in the production of such diverse items as lithographic printing plates or printing press parts requiring a high degree of hydrophilic surface characteristics, electrophotosensitive plates or other image carriers for use in the various aspects of electrophotography and the multiple reproduction of images achieved by electrophotography, heat and erosion or corrosion resistant coatings as for the inside of a hospital steam sterilizer or autoclave, protective water insoluble coatings for achieving enhanced erosion resistances of the exterior surface or skin of aircraft or missiles flying at high speeds through a rain storm, pigmented surface coatings for producing desired surface characteristics on printing papers, and other utility.

Despite the diversity and variety of applications to which various of the coating materials or coatings in accordance herewith may find enhanced utility, it is to be noted that all the coating materials or compositions or coatings in accordance herewith include, in the finished coating on the article being coated, a dried matrix of discrete solid particles of water insoluble inorganic material in a substantially continuous resinous film forming or binder layer comprising primarily a resinous material which is water soluble (at least initially prior to drying thereof), and the coatings are applied from a water solution of the binding material in which is dispersed, as a discrete particle solid reactant phase, the inorganic material mentioned.

Thus, regardless of the other and/or varied attributes of coatings in accordance herewith, application thereof is facilitated by the fact that all the coatings herein disclosed may be applied from a water solution and without the necessity of utilizing an organic solvent or a binder material which is insoluble in water. Such advantage has been found to have substantial commercial or economic desirability, particularly with the high volume production of coated articles according to this invention, because, among other reasons, the utilization of a water solution initially eliminates the necessity of solvent recovery (as might be economically mandatory in the use of a system requiring an organic solvent), substantially reduces the fire hazard routinely associated with organic solvent coating systems, eliminates in large measure the difficulties experienced with water insoluble binders when the binder sets up upon evaporation of the solvent on a coating machine when the machine must be shut down as for closing the plant overnight, etc.

Before noting more specifically some of the particular embodiments or applications of coating compositions and methods and products according to this invention in various fields, it might be well here to note, as illustrative, that:

One object of this invention is to provide coating compositions of the character described for coating from a water solution base onto a surface of paper, metal, and the like, a dried matrix coating including discrete particles of a water insoluble inorganic compound dispersed substantially uniformly in a film or layer of initially water soluble resinous film forming material.

Another object of this invention is to provide coated articles of the character described having on the surface thereof a dried coating including a matrix of discrete solid inorganic particles in an organic resinous film forming binder, which coating imparts to the surface of the articles controlled and desirable useful characteristics such as electrophotosensitivity or the characteristic of being hydrophilic or water insolubility or heat resistance or corrosion or erosion resistance as may be desired and upon selection of the particular coating formulation as disclosed in accordance herewith.

Another object of this invention is to provide methods and compositions for applying a protective or decorative coating to a surface from water solution, which coating, after application and drying, will be substantially insoluble in water and organic solvents, heat and corrosion resistant, tough and durable.

Another object of this invention is to provide a coating composition of the character described which can be formulated and applied from water solution to form upon drying a surface conditioning and protective or decorative coating with good adhesion and binding characteristics to a wide variety of different surfaces to provide thereover a water resistant, abrasion resistant surface layer.

Another object of this invention is to provide coating compositions of the character described for coating from water solution onto metal surfaces of lithographic press parts to form thereover a water conditioning, water insoluble, hydrophilic surface layer.

Another object of this invention is to provide lithographic plates and metal press parts having coated over the surface thereof a continuous hydrophilic water insoluble resin coating which is also compatible with oleophilic coatings applied thereover.

A further object of this invention is to provide a coating material for application as a sub-layer firmly bonded to the metal surface of lithographic plates and the like to render these surfaces permanently hydrophilic yet susceptible to being covered by a firmly bonded light sensitive lithographic coating.

Another object of this invention is to produce electrophotosensitive coating materials for use in electrostatic or electrophotographic reproduction processes and including a photoconductive material dispersed in a water soluble film forming and binder component.

A further object of this invention is to produce electrophotographic materials of the character described which may be coated from water solution onto the surface of a sheet or other image carrier base for use in an electrostatic or electrophotographic reproduction process.

Another object of this invention is to produce an electrophotosensitive material which is substantially insoluble in organic solvents.

Still another object of this invention is to produce an electrophotosensitive coating of the character described comprising a water soluble film forming binder which, after having been coated on a sheet or other image carrier base and dried, will exhibit dielectric and electrical properties for use in electrophotographic reproducing processes.

Another object of this invention is to produce a lithographic printing plate or master of the characteristics described having a printable image on the surface thereof produced by electrostatic or electrophotographic processing and including image areas which are oleophilic and non-image areas which are hydrophilic as the image is developed from the electrophotographic process and substantially without further treatment of the surface of the plate.

Another object of this invention is to provide a process of the character described for producing a developed electrostatic or electrophotographic image on the surface of a printing plate or other image carrier base in which non-image areas of the surface of the printing plate or other image carrier have hydrophilic characteristics as the image is produced and developed and substantially without further treatment of the surface of the plate or image carrier.

A further object of this invention is to provide an electrophotographic coating of the character described for application to a metal plate or other image carrier base such that when an image is produced thereon by electrostatic or electrophotographic processing such coating will provide inherently hydrophilic non-image areas.

Still another object of this invention is to provide a coating of the character described adapted for the electrophotographic reproduction of an image thereon and including a water soluble film forming material adapted to be coated from water solution to produce a water insoluble, electrically insulating, hydrophilic, electrophotographic film.

Other objects and advantages of this invention will be apparent from the following description and the appended claims.

As previously noted, there are a number of advantages attributable to coatings in accordance herewith, and such advantages and/or functions and the preferred or illustrative embodiments thereof will be set forth, for the sake of simplicity and clarity for men skilled in the arts to which this invention appertains, in the following subdivided categories of functional utility, although it is to be understood that this invention is not to be considered limited by the several illustrative expositions, but is, as noted, intended to include other specific formulations, methods, uses and products, and it is to be understood that the following examples and/or the uses to which they may be put are merely illustrative of the coatings and methods and coated articles produced in accordance with or embodying this invention.

ELECTROPHOTOGRAPHIC COATINGS

One of the various aspects of utility and novelty of coating compositions and methods and coated articles in accordance herewith has to do with production of electrophotographic or electrophotosensitive surfaces in which the aforementioned solid discrete-particle inorganic material is a photoconductor dispersed within a water soluble film forming binder solution to provide a coated electrophotosensitive surface for the production or reproduction thereon of an electrostatic charge image for use in electrophotography.

Electrophotographic or electrostatic reproduction processes of the character to which this invention relates include processes such as are disclosed in the copending application of Greig, Ser. No. 383,677, filed Oct. 1, 1953, and assigned to Radio Corporation of America, now U.S. Pat. 3,052,539, issued Sept. 4, 1962, and comprises generally the steps of impressing an electrostatic charge on a plate or paper or other image carrier base or sheet having an electrophotographic or electrophotosensitive surface, exposing the charged surface to a light image whereby portions of the charged surface corresponding to the light image are discharged to form an electrostatic image or pattern, and rendering the electrostatic pattern visible or developed by applying thereto a visible developing agent or powder having electrostatic charge characteristics such that it will be attracted to the charged areas and not to the discharged areas of the exposed surface, or vice versa.

Generally, as will be understood, the electrostatic or electrophotosensitive surface of such a plate or sheet or other image carrier base material may comprise a coating of an electrophotosensitive material in a film forming binder forming a matrix-type of surface on which an image may be electrophotographically reproduced. In such a matrix surface, the film forming binder for the electrophotosensitive or photoconductor material should have appropriate dielectric and/or electrical characteristics such that the surface may be given an appropriate electrostatic charge prior to being exposed to the light image.

Accordingly, it has previously been believed that the dielectric or electrical characteristics required that the film forming binder be water insoluble in order, among other reasons, to avoid possible electroconducting effects usually associated with an electrolyte or ionisable water soluble material.

In using water insoluble film formers to produce such an electrophotosensitive surface, however, difficulty may be experienced in coating the sheet or image carrier base with an organic solvent solution because of the required presence of organic solvents therein. Other difficulties may be experienced in keeping the photoconductor or photosensitive material, which is usually if not always an inorganic material, adequately dispersed or suspended in the film former coating solution.

According to this invention, however, electrophotographic coating materials are provided to produce electrophotosensitive coatings on the surface of a sheet or other image carrier base for use in electrostatic or electrophotographic reproduction processes and having water soluble film forming components which can be coated from water solution onto the surface of the sheet or image carrier.

It will be understood that, in electrostatic or electrophotographic reproducing techniques of the character to which this invention relates, an electrosensitive film is provided on the surface of a sheet or plate or other image carrier base on which a visible image is to be produced. This film must be capable of retaining an electrostatic charge and includes an electrically insulating film forming and binder component through which is dispersed a photoconductive or photosensitive component adapted to effect lowering or removal of an electrostatic charge selectively in those areas of the film which are exposed to light.

Considering as illustrative of such an electrophotographic reproduction process the use of a sensitized sheet of paper, an electrophotosensitive film is applied to the surface of the paper. This film, including an insulating or dielectric film forming component and a photoconductive component dispersed therein, is given a uniform negative electrostatic charge in a dark room or otherwise in the absence of light. The charged sheet is then exposed to a light image, as, for example, by projecting an image thereon through a photographic transparency. Wherever the light strikes the charged film on the sheet, the original negative electrostatic charge is lowered or removed through the action of the photoconductive component in the film. This leaves an electrostatic image or charge image on the sheet corresponding to the light image projected thereon.

This charge image or electrostatic image is then developed or made visible by applying to the film a positively charged powder or other finely divided developing agent which will cling electrostatically to those areas of the film which retain the original negative charge—i.e., those areas which were not struck by light during exposure to the light image. After the developing agent has rendered the electrostatic image visible, the agent may be "fixed" to the sheet as, for example, by fusing the developing agent to the sheet and/or spraying the agent with a clear lacquer, etc.

It has been found to be particularly advantageous in the coating or original preparation of the electrophotosensitive sheet or image carrier to apply the electrophotosensitive film or coating thereon from water solution, yet the film forming and binder component of the coating or film must be able to retain the required electrostatic charge at least for the length of time required to expose the film to the desired light image and develop the same.

Satisfactory results have been achieved according to this invention with a number of water soluble film forming and binder materials, and particularly film forming resin polymers having various polar groups or radicals rendering them at least initially water soluble. Also appropriate materials for use according to this invention are capable of being dried after coating and of maintaining themselves more or less continuously dry under normal humidity conditions without the adsorption or absorption of water to an extent which would adversely affect the electrical characteristics of the coating.

Of the various materials appropriate for use according to this invention, the resin polymers having higher molecular weights and a higher proportion of the molecule made up of non-polar groups or radicals are preferred. As illustrative of water soluble film forming and binder components for use in electrophotosensitive compositions embodying this invention are polyacrylic and polymethacrylic acid and ester resins, polyacrylic and polymethacrylic amides, polyvinyl compounds and particularly those with esters, hydroxyl or carboxyl groups thereon rendering them water soluble, yet not forming so much of the molecule as to impair electrical characteristics and/or resistance thereof. Also appropriate for use according to this invention are copolymer materials which may not be inherently water soluble but which can be made water soluble under certain conditions as, for example, partially esterified copolymers, polyvinyl methyl ether maleic anhydride copolymers partially esterified or part amide, polymethacrylic acid vinyl acetate copolymers, and similar types of resins which may be water soluble when neutralized to an alkaline pH but are not water soluble at an acid pH. In addition to the aforementioned water soluble characteristics according to this invention, the film former should have a relatively high dielectric constant and high dielectric strength, and should have sufficient strength and flexibility particularly if the coating is to be applied to paper to withstand bending and handling when coated as a thin film.

As will be understood, of course, such film formers should also be compatible with and substantially inert with respect to whatever photosensitive or photoconductive material is included in the coating. Among the known materials which exhibit electrosensitive or electroconductive properties for use in electrophotographic coatings are such materials as zinc oxide, titanium dioxide, zinc or cadmium sulphide, zinc selenide, and the like, although a commercial grade of zinc oxide (known as Florence Green Seal No. 8, sold by the New Jersey Zinc Co.) and the regular technical grade of titanium dioxide are preferred photoconductor materials.

The selection of a suitable photoconductive component may be made as disclosed in the copending application, Ser. No. 383,677, mentioned above. Thus, in order to determine whether or not a particular photoconductive substance is suitable for use in the present invention, a test of its photoconductive properties may be made as follows. A small quantity of the substance is reduced to a powder, the powder is compressed under high pressure, i.e., about 15,000 lbs. per square inch to form a pellet, electrodes, as of silver paste, are applied on a surface of the pellet leaving a square area of surface uncoated, the pellet is placed in a monochromator with the aforementioned uncoated surface area facing the light source, and successive wave lengths of light throughout the spectrum are projected on this surface. A D-C potential is placed across the electrodes and the current flowing between the electrodes is measured as a function of wave length with the intensity of radiation being held constant.

The photoconductive substances which are suitable are those which are substantially electrically nonconductive in the dark. When exposed to light, they should have a surface photoconductivity of a certain level in order to be of practical use in the present process. In testing substances in order to determine their suitability and utilizing a pellet form, it is convenient to express the results of the measurements of the test as a surface photoconductivity because substantially all of the light is absorbed within a thin layer at the surface of the pellet. It has been found that, to be useful in the present invention, the substance selected should have a surface conductivity of at least about $10^{-9}/\text{ohm}^{-1}/\text{square}/\text{watt}/\text{cm}^2$ when exposed to some wave length within the range of about 3800–7000 A.

Having established the threshold value of photoconductivity needed in the process, it is possible to test any photoconductive substance otherwise suitable from the standpoint of stability, compatibility, dark resistivity, color, etc., in order to determine whether it can be used.

A number of materials are satisfactorily photoconductive for use in electrophotographic processes, but zinc oxide is a preferred photoconductive material for use according to this invention and can be prepared in a white form or in a pink form. Of the various white zinc oxides commercially available, not all have a surface photoconductivity greater than about $10^{-9}/\text{ohm}^{-1}/\text{square}/\text{watt}/\text{cm}^2$ at a wave length of about 3900 A. which is about the wave length of peak photosensitivity for this material, but many pure grades of zinc oxides made by a dry process have been found suitable.

In these compositions, it has been found possible to vary the ratio of photoconductor to the film forming material over wide limits. The optimum quantity of photoconductor for any given composition will depend upon the particular film forming ingredient used since these vary considerably in electrical properities such as dielectric constant. It has been found, unexpectedly, that relatively pure zinc oxide, such as that designated C.P. or U.S.P. gives much better results in the present process than ordinary technical grade zinc oxide commonly used heretofore in pigments or in coated papers. Although the reason is not understood, zinc oxide having a very low concentration of impurities, when combined with the type of vehicle described herein, is capable of taking and holding an electrostatic charge in the dark and of being discharged in the presence of light.

Herewith are given chemical analyses of impurities found in three typical samples of zinc oxide which were found suitable for use in the process of the present invention.

|  | Percent | | |
| --- | --- | --- | --- |
|  | Made by dry process | Made by wet process | |
|  | No. 1 | No. 2 | No. 3 |
| Chloride | .001 | .000 | .001 |
| Insoluble in $H_2SO_4$ | .004 | .005 | .000 |
| Iron | .001 | .000 | .001 |
| Lead | .000 | .001 | .001 |
| Substances not precipitated by $H_2S$ | .05 | .014 | |
| Sulfur compounds (as $SO_4$) | .01 | .00 | .000 |

The physical form of the zinc oxide also has an effect on the optimum amount of this ingredient. There is an appreciable difference in density between the zinc oxide powers prepared by wet and dry processes.

White zinc oxide is a preferred photoconductive substance for use in the processes, coated base materials and apparatus of the present invention for a number of reasons. The fact that it is white causes it to be more acceptable for certain uses such as reproducing photographs. It is also relatively abundant and cheap, stable, compatible with synthetic resins and easy to apply as a coating on paper and other bases.

However, it has also been found that a pink form of zinc oxide exhibits desirable photoconductive properties similar to the white zinc oxide but is of the order of several times faster with regard to length of exposure required for incandescent light. Moreover, the pink zinc oxide is responsive to light throughout most of the visible spectrum whereas the white zinc oxide has its peak response in the ultra-violet range.

One method of manufacturing a pink zinc oxide suitable for use in the present invention is described and claimed in U.S. patent application, Ser. No. 329,473, filed Jan. 2, 1953, Conn et al., assigned to Merck and Company, Inc., now U.S. Pat. 2,898,191, issued Aug. 4, 1959. The process described in the said application comprises heating ammoniated zinc carbonate at a temperature of 100–400° C. Preferably, the carbonate is heated at 250° C. for about 1–2 hours or until all of the amounts and carbon dioxide are released. At this point a weight loss of about 43% will be realized and the resulting product will have a particle size of about 100–200 A. The ammoniated zinc carbonate may be first prepared by adding white zinc oxide to a solution of ammonium carbonate in 28% ammonia water, blowing in carbon dioxide until no further separation of solid occurs, filtering out the solid, which is the ammoniated zinc carbonate, washing and drying.

The pink zinc oxide, prepared as above described, may be substituted, weight for weight, for the white zinc oxide given in the examples and the compositions suitable for use are also otherwise the same as those shown in the examples.

As noted, some of the water soluble binders for use according to this invention may be water soluble only at an alkaline pH. Also some of them (e.g., polyacrylic acid) may form insoluble precipitates with a photoconductor such as zinc oxide at an acid pH, or may change solubility characteristics when partially esterified. For this reason it is necessary with such binders to neutralize the film former solution, preferably before the addition thereto of the photoconductor, so that the resultant composition can be coated from water solution as desired.

The presence, however, of a substantial amount of active alkaline material in the final coating may interfere with the desired electrical properties and/or resistance of the dry coating either because of the presence of electrolytic material and/or low molecular weight charge carriers or as rendering the coating softenable by absorbed moisture. Thus, in preparing the water soluble coating composition for practicing this invention, it is preferred to use as a neutralizing or solubilizing agent an alkaline material which is volatilizable or which otherwise may be removed from the applied coating during the drying thereof. Satisfactory results have been achieved in this connection using aqueous ammonium hydroxide and/or such volatile organic bases as monoethylamine.

In formulating the electrophotosensitive coating for this invention, it is also important to consider the ratio of photoconductive material to film forming binder. If this ratio is too low, the photosensitivity may be decreased to the point where the electrostatic film will not be adequately discharged even with excessive exposure. Alternatively, if the proportion of the photoconductor is increased, the tendency of the charged film to discharge itself even in the dark and prior to exposure also increases. As will be understood, if too much of the solid photoconductor material is present, the ability of the binder to form a continuous film matrix may be interrupted.

There is, thus, obtained an electrophotosensitive surface on one or both sides, as desired, of a metal plate or paper or plastic or other image carrier from a water solution coating, which surface, when dried, possesses satisfactory electrophotosensitive characteristics for use in conventional manner in electrophotography.

ELECTROPHOTOGRAPHIC LITHOGRAPHIC PRINTING PLATES

It may be desired to utilize such an electrophotographic process for the purpose of producing on a printing plate the original image to be reproduced by printing thereby or therefrom, instead of using conventional photochemical photographic techniques such as silver halide or diazo or albumen light-sensitive emulsions commonly employed for photographically transferring to the surface of a printing plate the image to be inked on the printing press and printed therefrom in lithography or other printing processes.

If it is desired to use such a process to produce a printing plate or master for use in offset lithography, the surface characteristics of the finished plate with the developed visible or printable image thereon must be adapted to the requirements of the offset lithographic process. That is, as is well known, offset lithography includes applying water or an aqueous solution to non-image areas of the printing plate which are not to be printed and printing ink to image areas of the printing plate for transfer to the paper or other material being printed. Accordingly, a suitable lithographic printing plate has such surface characteristics that the image to be printed is receptive to printing ink and is relatively hydrophobic, whereas the non-image areas of the plate from which no ink is to be transferred to the paper are hydrophilic.

If it is attempted to produce a printing plate or master suitable for lithographic printing by a process in which the image is originally applied to or developed on a coating or film of oleophilic or hydrophobic materials, such materials must be removed from all non-image areas of the plate or alternatively such non-image areas must be treated to make them adequately water receptive. In attempting this, difficulty may be found in removing the coating from the non-image areas of the plate sufficiently or in undercutting or otherwise damaging the edges of the image areas, or in finding solvents or other cleaners which will remove the coating from the plate in non-image areas while not affecting the image areas.

According to the invention, however, a lithographic plate, adapted for electrostatic or electrophotographic processing to achieve thereon a visible or printable image formed of hydrophobic material, may be produced by applying to the plate backing a dispersion comprising water, a water-soluble binding material and a photoconductive material, the resultant coating being substantially insoluble in water but highly hydrophilic in those areas not protected by the image material, whereby the plate is suitable for lithographic printing without additional treatment of such non-image areas.

Considering, as illustrative of the application of such an electrophotographic process to a metal printing plate to be used in offset lithography, an electrophotosensitive coating or film is first applied to the surface of the plate. This film, including the insulating film forming component and a photoconductive component dispersed therein, is given a uniform negative electrostatic charge in a dark room or otherwise in the absence of light. The charged plate is then exposed to a light pattern, as, for example, by projecting an image thereon through a photographic transparency. Wherever the light strikes the charged coating on the plate, the original negative electrostatic charge is lowered or removed through the action of the photoconductive component in the film. This leaves an electrostatic image or charge image on the plate corresponding to the light image projected thereon.

This charge image or electrostatic image is then developed or made visible by dusting or otherwise applying to the film a positively charged powder or developing agent which will be attracted electrostatically to those areas of the plate which still retain the original negative charge, i.e., those areas which were not struck by light during exposure to the light pattern and, accordingly, those areas which should be dark in the final visible image. After the developing powder or agent has rendered the electrostatic pattern visible, the powder or agent is "fixed" to the plate as, for example, by fusing the developer to the plate by heat. If the plate is to be used in lithography, the developing agent, after fixing, should be well bonded to the coating and should present an oleophilic or ink receptive surface on image areas of the plate, and satisfactory such developing agents include a mixture of 200 parts Piccolastic Resin 4358A (sold by the Pennsylvania Industrial Chemical Corp.), 12 parts carbon black, 12 parts Spirit Nigrosine SSB, and 8 parts Isol Black (the latter two components being sold by National Aniline Division of Allied Chemical & Dye Corp.).

As will be understood, the result of the foregoing process is a finished plate or other image carrier having an electrophotographic film on the surface thereof, with image areas covered with developing powder or agent fused or fixed thereto and non-image areas comprising the original coating film thereover.

Water-soluble synthetic resinous materials having a relatively high dielectric constant, high dielectric strength, and high electrical resistance when in the dry state and capable of binding together in a thin film matrix particles of an uniformly dispersed photoconductive component are satisfactory for use according to this invention. In addition to forming an insulating layer or film upon drying and avoiding adverse chemical reaction with the photoconductive component, the film former should be capable of producing an adequately strong and wear-resistant film for use in an offset press and, if it is to be coated on paper as the image carrier, should have sufficient strength and flexibility to withstand bending and handling when coated as a thin film. Also, particularly with lithographic plates, the finished or dried electrophotosensitive film, as above noted, should be sufficiently water insoluble and hydrophilic to be susceptible of repeated contact with water and/or lithographic fountain solutions during the printing process without softening or dissolving.

As noted above in connection with the foregoing section hereof, a number of initially water soluble film forming and binder materials have appropriate dielectric characteristics for use in electrophotography, and also can be insolubilized or rendered substantially water insoluble as a dried film at, for example, an acid pH, although water soluble at a neutral or alkaline pH. Since most conventionally used water fountain solutions in lithographic printing are maintained at a slightly acid pH, such resinous materials are especially appropriate for the film forming or binder component of electrophotosensitive coatings according to this invention, particularly since they form a water insoluble surface on a lithographic plate which, in use, is repeatedly subjected to the fountain solution of the lithographic press and also possess a satisfactory degree of water receptivity or hydrophilic characteristics for use in lithographic printing.

As illustrative of those of the particular types of binder components mentioned above and which are particularly adapted for use in preparing a lithographic plate in accordance with this aspect of this invention, may be noted polyacrylic acid resins, methacrylic acid vinyl acetate copolymers, and similar types of resins which may either be made water soluble when neutralized to an alkaline pH or which may combine with photoconductive components to form a satisfactorily insoluble yet hydrophilic film. In addition to the foregoing water soluble and hydrophilic characteristics, the film formers according to this invention should have a relatively high dielectric constant, high dielectric strength, high resistance, substantial toughness to withstand the abrasion to which they are subjected on a lithographic plate in use, and sufficient flexibility to withstand such bending stresses as may be expected with a lithographic plate.

Thus, if desired, this invention also provides a coating material for producing an electrophotosensitive coated surface on a printing plate (which may be of metal, paper, or other material) and which also possesses the additional characteristics of sufficient water insolubility under the conditions of use and hydrophilic properties to manufacture a lithographic printing plate for use in conventional lithographic techniques and on which the image to be printed may be photographically produced from a conventional transparency or other conventional source by electrophotography.

As will be understood, of course, in view of the known characteristics and requirements of lithographic printing, the additional high degree of water insolubility and hydrophilic characteristics desired or satisfactory in lithographic plates may not, necessarily be achieved by all of the resinous binder materials within this invention, but, in view of the foregoing discussion and the description below of various illustrative examples and materials, a man skilled in this art may readily select and utilize those of the available or disclosed film forming materials which do provide a satisfactory matrix coating having satisfactory lithographic characteristics in addition to the electrophotographic characteristics discussed above.

After being coated on the metal plate or other image carrier base, the finished films embodying this aspect of this invention are permanently and inherently hydrophilic for satisfactory use with normal offset printing press fountain solutions, since, after heat treating and drying, the films embodying this aspect of this invention are essentially insoluble within a pH range of approximately 3.3 to 8.6, and the finished films on the image carrier bases may be stored ready for use with subtantially no deterioration with time. When applied to an offset printing plate, the invention provides more convenient and less expensive preparation of the plate since the need for extra or additional chemical or mechanical treatment of the plate after developing the image thereon is eliminated as compared with other electrophotographic processes in which the non-image areas of the plate must be treated to provide the required hydrophilic characteristics. The films produced according to this aspect of this invention exhibit satisfactory wear resistance in use on printing plates, and have good mechanical adherence to metal surfaces.

COATINGS FOR LITHOGRAPHIC PRESS PARTS

It is also to be understood that certain of the coatings embodying this invention may be formulated and applied to lithographic plates and other press parts to provide thereover a desirably water insoluble and hydrophilic surface coating for use in lithographic printing even when the printed image is impressed upon the plate by conventional techniques other than electrophotography, and also to provide a satisfactory surface conditioning film over the parts of a lithographic press, such as fountain rolls, which are desired to be maintained in a continuously hydrophilic condition.

Thus, in printing in the lithographic manner, as is well known, those portions of the printing plate from which no ink is to be transferred to the paper being printed are repeatedly covered with water or water fountain solutions containing various conditioning and corrosion inhibiting materials. Similarly the so-called fountain rolls in a lithographic press water fountain—i.e., those rolls which apply water or a fountain solution to non-printing areas of the plate—are also constantly subjected to contact with the water or fountain solution.

It is, thus, important for good printing results in printing processes of a lithographic nature that the non-inked areas of the plate remain permanently hydrophilic to an extent assuring that the lithographic ink will not adhere thereto during printing. Similarly the surfaces of the fountain rollers, and particularly those with metal surfaces, should remain permanently hydrophilic or at least sufficiently oleophobic to avoid inadvertent deposits of ink from building up thereon.

The possibility that non-inked areas of a lithographic plate may lose some degree of the required characteristic of being hydrophilic sufficiently to admit the inadvertent clinging of ink thereto is, perhaps, most graphically apparent when the lithographic printing of fine half-tones is considered. For example, a very dark gray area of a half-tone will have a substantial proportion desirably covered with ink and interrupted by small white dots to give the illusion of a dark gray but not wholly black area. As the plate is repeatedly used in printing, the area of plate surface having such tiny white dots, unless it is quite hydrophilic, may alter sufficiently for ink to build up in the little white dots to an extent where some or all of the white dots may vanish in the reproduced printed work.

Similarly, since one or more of the fountain rollers which apply water or a fountain solution to non-inked areas of the plate conventionally oscillate axially to distribute the fountain solution evenly over adjacent rollers and/or the plate surface, there may be danger that some ink will be transferred from the plate to the fountain rollers and will build up thereon to a detrimental extent, particularly when it is realized that substantial shearing forces may be experienced at the nip between the fountain rolls and the plate and that such forces may indeed be sufficient over prolonged time to emulsify some of the ink into the fountain solution (or vice versa) with results detrimental to the desired quality of the printed product.

For this aspect of this invention, then, coating materials are produced for applying to various lithographic surfaces and for conditioning such surfaces for subjection to repeated applications of water or a water fountain solution to render such surfaces more hydrophilic and/or hydrophilic for a longer continuous period of time than is the case with untreated metal or other surfaces. Such surface treatment is achieved according to this invention on plates or other surfaces, whether of metal, paper, or other materials, from water solution coatings to form water insoluble dried film matrices on the surfaces which are satisfactorily hydrophilic for long periods of time and, yet can be readily dissolved or removed from the coated surfaces if desired, and without regard to whether the finished or the coated articles may also possess unused additional electrical or other characteristics useful, as noted above, for electrophotographic or other applications.

Considering, as illustrative of embodiments of this invention, a lithographic plate, it should be noted, as well known, that the surface of such a plate is provided with a light sensitive coating which may be of a number of conventional and well known forms and compositions. The image to be printed from the plate is photographically projected or imposed upon the light sensitive coating and the exposed portion of this coating developed by appropriate well known and conventional means. Areas of the developed image from which ink is to be transferred to the material being printed are oleophilic and receptive to the greasy type of ink used in lithographic printing, whereas in other areas of the developed image from which no ink is to be transferred to the material being printed, the light sensitive layer is removed to expose the surface of the plate, which should be hydrophilic and receptive to the water or fountain solutions used.

Accordingly, coating compositions embodying this invention for application to the surface of a lithographic plate prior to the application, exposure, and development of the light sensitive coating or layer have a number of apparently inconsistent and yet important properties and functions. For example, the coating must bond firmly to the metal or other surface of the plate; the coating must be durable and resistant to the constant abrasion wear to which the plate is subjected during printing; it must be as permanently hydrophilic as possible and preferably resistant to oxidation or other changes which might affect its hydrophilic character, particularly if the plate is allowed to dry between runs; it should be insoluble in water or fountain solutions even under the severe scrubbing or attrition action to which it is subjected in use; and yet it should also form a surface to which an oleophilic light sensitive coating or layer can be firmly bonded. Satisfactory results according to this invention have been achieved in producing coating materials and compositions having the aforementioned properties and characteristics by using film forming resins which have been admixed or reacted with other materials or reactants which will render the resin initially water soluble for application as a coating but which can be later converted to a water insoluble film.

As illustrative of such resin materials with which satisfactory results have been obtained is noted polyacrylic acid polymers as film forming binders in which are dispersed solid particles to form a matrix-type finished film. With such materials, then, a water solution of the film former is produced by neutralizing the resin to a neutral or alkaline pH with a basic substance capable of being volatilized or otherwise driven out of the coating during the heat treatment thereof. As illustrative of such basic substances are volatile inorganic bases, such as aqueous ammonium hydroxide, or water soluble organic bases. The solid material in the applied and dried coating forms a matrix which appears to enhance both the water insolubility of the coating as well as the hydrophilic or water carrying characteristics thereof. The oxides of certain bivalent metals, such as zinc oxide, can be admixed or dispersed in a neutralized solution of the film forming binders, yet, when the neutralizing agent is volatilized or removed, a tough, hard insoluble precipitate or film is formed. This is particularly noticeable as a reaction between the zinc oxide and polyacrylic acid.

Aluminum also enters into an apparently similar reaction with polyacrylic acid, and an insoluble film may be formed on the surface of a zinc or aluminum plate by having the insolubilizing reaction between the film former and the zinc or aluminum occur in situ as the acid reacts with the zinc or aluminum surface of the plate. Compositions according to this invention, however, are to be distinguished from such a situation not only in that the matrix type of film with discrete particles of solid dispersed therein gives improved water insolubility and water carrying characteristics, but also since the coating compositions here are, in a manner of speaking, self-contained and do not require any particular reaction with the surface being coated and are provided in thicker films than merely monomolecular layers. Indeed, the hydrophilic composition layers formed by this invention may render useful surfaces and materials otherwise not susceptible to lithographic techniques.

As noted above, since most, if not all, fountain solutions utilized in lithographed printing are conventionally maintained at an acid pH or, at least, not at a basic pH, coatings in accordance with this invention which are insolubilized by lowering the pH in the elimination of the neutralizing or other solubilizing component, are particularly adapted for maintaining the desired state of insolubility in use on lithographic press parts. Yet, should it be desired, such coatings can be readily removed from the plate or other part by washing with an alkaline solution.

Although, as noted below, both the hydrophilic and water insolubility charatceristics of films in accordance herewith appear to improve with increased solids content and increased ratios of the discrete solid particles to resin binder material, it is desired, particularly in the preparation of an undercoating for lithographic plates over which is to be applied a conventional photochemical photographic coating, to avoid incorporating into the first coating such a large proportion of solid particles as might mechanically interfere with adequate stripping of unexposed portions of the photosensitive coating from the surface conditioning coating of this invention.

Other additives in addition to the neutralizer and dispersed solid particles may also be added to compositions according to this invention to enhance the hydrophilic characteristics of the coated product and/or to condition the coated surface to pick up water more readily and quickly. Such other additives include natural and synthetic gums and resins, which react chemically in the film without affecting the water insolubility characteristics thereof. Illustrative of such additives may be noted carboxy methyl cellulose, carboxy methyl starches, zinc ammonium alginate, etc. Other materials may also be included to condition the water receptivity of the coated surface, even though such other materials may not react chemically with the binder but may be trapped physically in the film along with or without the solid particles forming the matrix. As illustrative may be noted polyhydric alcohols such as glycerols, polyethylene glycol or sorbitol; natural gums such as gum Arabic, etc.; and conventional water conditioning material such as various phosphates which do not have adverse effects on the desired water insolubility characteristics, although the inclusion of various inert mineral filler materials, and the like, particularly in coatings according to this invention where the characteristics of water insolubility and hydrophilic properties are important, appear to have the result of interrupting the principal coating matrix or otherwise interferring with or diminishing the properties and results desired.

PROTECTIVE OR DECORATIVE COATINGS

In addition to the foregoing applications for coatings and methods and coated articles in accordance with this invention, satisfactory results have also been achieved in other uses and applications, broadly within the protective and/or decorative coating field, in which there are many specific uses which may have defined successful or practical solution with types of coating materials heretofore known. In other instances, more or less satisfactory protective coatings have been developed for specific applications by concentrating on one or another specific characteristic of the coating material with sacrifice of other characteristics, broad utility, ease of formation and application, etc.

According to this invention, however, coating materials and methods and compositions have been developed with characteristics adapting them to a wide range of protective and decorative and surface conditioning coating applications, even in addition to those mentioned above, and possessing many advantages over materials heretofore known in terms of the specific characteristics of the finished coating, as well as in terms of application to whatever surface is to be protected, treated, or conditioned, although all the various coating materials and/or coated articles coming within the scope of this invention may not be equally applicable to all the various uses or applications described or desired.

As noted above, for example, whereas all of the coating compositions embodying this invention as disclosed herein embody a matrix coating of solid discrete particles dispersed within a resin binding material which is, at least initially, water soluble, the final resulting dry matrix film or coating layers may exhibit, depending upon the specific formulations thereof, varying degrees of water insolubility and other characteristics. Some of the coating formulations in accordance with this invention, however, produce a dry coating layer or film matrix on a variety of materials with such outstanding water insolubility characteristics and heat resistance and erosion and corrosion resistance as to lend themselves to a wide variety of applications substantially beyond the specific uses heretofore mentioned.

For example, as illustrative of such specific compositions having application beyond the uses already mentioned, may be noted those utilizing the peculiar reactions or interactions of a synthetic resinous polymeric film forming and binding material, such as polyacrylic acid, and a bivalent metal essentially insoluble inorganic salt or oxide, such as zinc oxide. It has been found that adding zinc oxide to a water solution of polyacrylic acid produces a substantially immediate rock-like precipitate of great toughness, hardness and durability and which is substantially insoluble in water or organic solvents. Such precipitation, however, occurs so immediately when zinc oxide is added to polyacrylic acid as to preclude as a practical matter applying the material as a coating, etc.

According to this invention, however, it has also been found that, if polyacrylic acid is first neutralized to a substantially alkaline pH, zinc oxide can be incorporated or dispersed in such a neutralized solution quite readily, and the resulting dispersion can be readily coated over a wide variety of fibrous, resinous and metallic surfaces by existing coating techniques. So long as the alkaline neutralizing material remains present in the coating, some substantial degree of water solubility remains inherent even after drying. If, however, the neutralizing material can be removed from the coating, as during the drying thereof, the desired tough, insoluble, water resistant coating is formed.

While the details of the chemistry and mechanics of the various reactions and interactions may not now be understood completely, useful hypotheses can be made. For example, it is believed that the neutralizing of the acrylic acid polymer reorients or otherwise modifies the spacial relation or molecular configuration of the polymer material to preclude or interfere with immediate formation of an insoluble precipitate with zinc oxide. Alternatively, it may be that a complex zinc ammonium polyacrylate is formed which remains essentially water soluble at least until the ammonia is removed during drying. It may also be that the molecular configuration of the polymer is altered by the neutralizing agent so that solid zinc oxide particles may interfit themselves into the polymer arrangement while the polymer molecules are stretched out or relaxed, so to speak, by the neutralizing material to be firmly locked in place upon evaporation of the neutralizer. In any case, it is noted that some reaction takes place between zinc oxide and the acrylic acid forming, apparently, an insoluble zinc polyacrylate.

Such reaction however, does not explain the final characteristics of the film or coating since the desired results are not completely obtained if the zinc oxide is present in no more than stoichiometric proportions. That is, a number of advantages of this invention apparently are related to the fact that the final coating includes a matrix of finely-divided, uniformly dispersed, solid zinc oxide particles in a tough film of polyacrylic acid, or a zinc salt thereof, or, perhaps, a mixture of both.

Thus, a sharp and emphatic difference in the properties of the finished film is noted as the proportions of zinc oxide to polyacrylic acid is raised from 2 to 1 to 3 to 1. To take as but one illustrative example of this marked change the characteristic of water insolubility, it is noted that a film of polyacrylic acid and zinc oxide having those materials present at a ratio of 2 parts zinc oxide to 1 part polyacrylic acid by weight will become softened readily and removable almost immediately from a metal plate coated with the material when subjected merely to immersion in boiling water. By contrast, a coating of comparable thickness but having the zinc oxide present in a ratio of 3 parts by weight to 1 part of polyacrylic acid gives no apparent softening or swelling when immersed in boiling water for a prolonged period of several hours or more. Although other properties of the finished film may vary somewhat as the zinc oxide proportion is increased substantially above 3 to 1, such variations have not been noted to be so sharp or marked as occurs immediately above 2 to 1, thus suggesting that a marked change in kind, rather than merely in degree, occurs at the 2 to 1 threshold which may, then, be a more or less critical proportion for achieving the reactions or interactions to provide completely the desired characteristics in the finished film or coating.

Accordingly, extremely emphatic advantageous characteristics in the film are noted. For example, a metal plate coated with such a composition can be brought up to a cherry-red temperature for prolonged periods without carburizing or other undesired effect on the coating and more surprisingly, without the usual scaling or surface oxidation of the metal. Also various metal surfaces having such a coating thereon have been subjected for prolonged periods to the corrosive and scrubbing action of steam at 20 pounds or more pressure without noticeable effect on the coating and without the usual erosion or corrosion effect on the metal surface.

Coating materials embodying this invention have good adhesive and bond properties to metal surfaces and, perhaps because of being adapted to be applied from water solution, exhibit good adhesive and mechanical bonding to fibrous surfaces such as wood, paper, and the like, where, incidentally, the substantial fungicidal characteristics of the coating provide yet another protective advantage. If desired, a wide variety of dyes may be incorporated in the coating to produce a wide range of colors without interfering with the mechanical, chemical, electrical, or solubility characteristics thereof, and the porosity of the coating, perhaps to some extent a function of the proportion of the discrete zinc oxide particles in the matrix, is controllable over wide limits.

As will be understood from the foregoing, whereas some of the coating formulations or articles and materials embodying and for practising this invention may be particularly adapted to providing such specialized characteristics as electrophotosensitivity, etc., for uses or applications in which a high degree of water insolubility is not required, others of the products and processes of this invention may additionally possess characteristics of importance or utility in other fields, whether or not they also possess the aforementioned specialized characteristics. Thus, for example, a coating formulation comprising polyacrylic acid and zinc oxide, while also possessing desirable electrophotographic and/or lithographically hydrophilic characteristics, may additionally or alternatively possess the heat resistance and erosion resistance noted so that—regardless of the enhanced advantages of such a coating in the electrophotographic or lithographic arts— satisfactory results have also been achieved with the utilization of such a coating as a protective or decorative coating in such widely disparate applications as a protective coating to protect the inside of a high pressure steam sterilizer or autoclave from the erosive and heat-corrosive effects of steam therein, protecting metal surfaces from water corrosion or erosion as previously noted, heat protection of metal surfaces and other surfaces, etc.

Nevertheless, the various coating materials embodying this invention are all produced from water solutions of a resinous film forming binder having dispersed therein discrete particles of solid inorganic material to form a dried film matrix, and, although all the finished coatings and coated articles embodying this invention may not in all respects achieve equivalently enhanced results in all areas of utility to which they are adapted, they all have in common the formation of a dried matrix film or layer of adequate water insolubility from an initially water soluble binder solution having, during application of the coating film, dispersed therein solid water insoluble inorganic discrete particles.

As further illustrative of the various coating materials and formulations embodying and for practising this invention may be noted the following examples of formulations, although it is to be understood that each of the follwing may not be equivalently desirable or preferred for all of the various uses to which the coating materials or methods or articles embodying this invention may be put:

Example I 203 grams polyacrylic acid solution (containing 30.45 grams polyacrylic acid and sold by B. F. Goodrich Chemical Company as "Goodrite K704")
240 cc. deionized water
70 cc. aqueous ammonium hydroxide
182 grams zinc oxide particles (about 0.02 micron in the average size)

Example II 200 grams polyacrylic acid solution (containing 30 grams of polymer, also "Goodrite K704")
250 cc. deionized water
40 cc. aqueous ammonium hydroxide
360 grams zinc oxide particles Example III 240 grams polyacrylic acid solution ("Goodrite K704" containing 36 grams polymer)
220 cc. water
50 cc. aqueous ammonium hydroxide
108 grams zinc oxide particles Example IV 75 grams methacrylic acid/vinyl acetate copolymer (sold by E.I. du Pont de Nemours as "Elvalan and identified as a copolymer of vinyl acetate and crotonic acid
415 cc. deionized water
50 cc. aqueous ammonium hydroxide
150 grams zinc oxide (solid by New Jersey Zinc Co. as "Florence Green Seal No. 8")

Example V 240 grams polyacrylic acid solution (containing 36 grams PAA and sold by B. F. Goodrich Chemical Company as Goodrite K704")
175 cc. deionized water
50 cc. aqueous ammonium hydroxide
144 grams zinc oxide Example VI 75 grams methacrylic acid/vinyl acetate copolymer
250 cc. deionized water
50 cc. aqueous ammonium hydroxide
150 grams finely divided titanium dioxide

Example VII 44.4 grams polyacrylic acid solution (6.7 grams polyacrylic acid)
50 cc. deionized water
18 cc. aqueous ammonium hydroxide
20 grams finely divided zinc sulfide

Example VIII 15 grams polyacrylamide
300 cc. deionized water
75 grams zinc oxide
aqueous ammonium hydroxide to pH 9

Example IX 15 grams polyvinyl methyl ether/maleic anhydride copolymer
300 cc. deionized water
75 grams zinc oxide
aqueous ammonium hydroxide to pH 9

Example X 15 grams polyvinyl methyl ether/maleic anhydride copolymer half amide
300 cc. deionized water
75 grams zinc oxide
aqueous ammonium hydroxide to pH 9

Example XI 100 grams polyacrylic acid solution (15 grams polymer)
100 cc. deionized water
aqueous ammonium hydroxide to pH 9.5
120 grams finely divided titanium dioxide

Example XII 240 grams polyacrylic acid solution (containing 36 grams polymer and sold by B. F. Goodrich Chemical Company as "Goodrite K704")
175 cc. deionized water
50 cc. aqueous ammonium hydroxide
144 grams finely divided zinc oxide (solid by New Jersey Zinc Company as "Florence Green Seal No. 8")

In the foregoing examples the solid inorganic particle material was dispersed in a water solution of the film forming resin components, with neutralizing or other solubilizing action as noted or as necessary, and the resulting dispersion was then coated on the desired surface to be coated, whether a metal surface or sheet, paper or other fibrous material, or other surface, and the resulting coating was heat treated or dried at around 150° C. to 170° C. for about 30 minutes. During this drying or heat treatment, the water of solution and any volatile neutralizing components were driven off, thus lowering the pH of the coating to a point where the resin sets up with the inorganic solid particle phase to form the desired dried matrix coating or film layer.

Satisfactory results are achieved by the addition of the resin solution, neutralized or solubilized as indicated or necessary, to wa wet slurry of the solid particle phase with constant stirring or a variety of other technique to achieve a uniform and complete dispersion of the finely divided solid particles in the coating solution, such as, for example, a colloid mill, high shear mixing apparatus, etc. Preferably, however, the formulation of the coating has been found to be most satisfactorily and most readily achieved by first boiling the zinc oxide or other solid particulate material in water before mixing, and then either adding the resin solution to the boiled slurry or straining or filtering the water from the slurry before adding the solution.

It appears that such preliminary boiling of the dried solid particles in water has the effect, perhaps particularly because of the fine particle size desired, of adequately wetting the surface of each of the particles (as by the agitation as achieved from the boiling action) and/or driving off by heating the air which may be occluded or adsorbed in or on to the particulate material. Such boiling dispersal preliminary treatment appears to give enhanced results, perhaps because the adsorbed or occluded air is more readily eliminated and the individual particles more readily wetted by boiling in water than would occur by stirring or milling in the more viscous resin solution, with concomitant breaking down or elimination of agglomerates of the solid particle phase in the resin solution to achieve the desired substantially complete and uniform dispersion for coating of the resultant material.

It may also be noted that the addition of surfactants for the purpose of wetting out or aiding in the desired dispersion of the solid particle phase is aplicable to some of the coating compositions embodying this invention, but is not generally preferred with such of the compositions as it may be desired to utilize for electrophotographic applications, because, as will be understood, unless the added surfactants are eliminated during the drying or heat treating step, the inherent electrical characteristics thereof may adversely affect the desired high dielectric characteristics desired in a coating according to this invention which is to be put to an electrophotographic use, and may also adversely affect other characteristics of the coating in applications where very high water insolubility and steam erosion resistance is desired.

Actually, in instances where the presence of a surfactant in the dried coating is not objectionable, it may be noted that some of the aforementioned resinous film forming materials have beneficial and inherent surfactant characteristics in the formation of dispersed coating compositions in accordance herewith. Indeed, particularly with the dispersing technique noted above for the inorganic pigments, one may obtain adequately dispersed coating compositions with some of the resin binders noted above even without including in the original composition a volatilizable neutralizing component, and examples of such resin may be noted as those set forth in Examples VIII, IX and X, and even with resin-to-pigment ratios of the order of 1 to 5. Although careful dispersion may be required and a somewhat longer heat treatment desired, satisfactory results are achieved in producing coating materials of high solids content and appropriate viscosity for coating procedures even without a separate neutralizing component to achieve results where, although the dried coating may not be completely insoluble in water, it does possess a degree of insolubility appropriate even for electrophotographic uses.

Furthermore, and particularly in those applications of this invention in which the electrical or electrophotographic characteristics of the finished product are considered more important than other characteristics of the coating or coated material, some other considerations in the formulation of the coatings in accordance with this invention may usefully be kept in mind. For example, as will be understood, one of the important characteristics for an electrophotosensitive surface of optimum usefulness or efficiency in the electrophotographic reproduction of light images is the high dielectric characteristic of the surface and/or the elimination, as much as practicable, of components therein which might tend, by ionization or molecular mobility or otherwise, to dissipate the uniform electrostatic charge imparted to the surface prior to exposure thereof to the light image during the electrophotographic process. This tendency to dissipate the electric charge impressed upon the surface prior to exposure may generally be referred to as "dark decay" of the charged surface, which term refers to the rapidity with which the impressed electrostatic charge is dissipated in the dark and prior to any exposure of the photoconductive or photosensitive element to a light image.

As will be understood, the fidelity or facility of electrophotographic reproduction on the electrophotosensitive surface may be substantially diminished if the charge originally impressed thereon diminishes or escapes prior to exposure to the light image since, naturally, the ultimate development of the electrostatic image and the distinctions achieved between light and dark areas thereof depend upon, in large measure, the electrostatic charge differential or gradient produced on the original charge by the discharge of selected areas of the surface during exposure in accordance with the activity of the photoconductive component therein.

Accordingly, the presence in the finished coating of ionizable components or other molecular mobility or moisture, etc., may have the effect of increasing the "dark decay" of the surface as by diminishing the total resistivity thereof and/or providing an undesirable facility for the conducting away or discharge or leakage of the electrostatic charge applied thereto prior to exposure to the desired light image. When such considerations are of importance, it is preferred to treat the various materials utilized in the formation of coatings and products in accordance herewith to eliminate therefrom impurities or other constituents which might detract from the desired high resistivity of the finished coating.

For example, as noted in some of the formulations above, is preferred to use water which has been "deionized" as by being passed through a conventional ion exchange column or otherwise treated for the elimination therefrom of possible ionizable impurities which might remain in the finished coating even after evaporation of the water vehicle therefrom. Similarly, it may be preferred, to achieve optimum resistivity in the finished coating, to make sure that the resin polymer component thereof is substantially free from unreacted monomer, anionic impurities, and even low molecular weight polymers, and the like.

Thus, commercially available polymerized resin materials, such as polyacrylic acid, may contain polymers of widely varying degrees of polymerization, and even unpolymerized monomers of the acrylic molecule. Since it is believed that a significant part of the electrophotosensitive (as well as the water-insolubility and hydraphilic) characteristics of coatings and materials according to this invention may stem from the interaction of a portion of the solid particle material with the higher molecular weight polymers to introduce into the binder film, as by steric hindrance or otherwise, a lack of normal reactivity to provide the desired film base for enclosing the rest of the particle phase to form the matrix layer, the presence of monomer material or, even, low molecular weight polymers, in addition to other impurities, may interject into the finished film an unstabilized component or a reactive or molecularly mobile component to diminish the ultimate results desired. Also, particularly with those of the binding materials which are acids, the lower molecular weight polymers or monomers may actually dissolve the solid particles, such as zinc oxide, because the smaller size molecules present less opportunity for steric hindrance, and any such dissolving of the oxide may produce metal ions also reducing resistivity.

Accordingly, in cases where the ultimate in resistivity or other characteristics are desired, it may be preferred to react the film forming resin polymer, in known manner, with an ion-exchange resin for the removal thereof of low molecular weight polymers, monomers, and other anionic impurities. Such treatment, as is well understood, preferably involves subjecting the film forming resin material to contact with an ion-exchange material (as by flowing through a reaction column or stirring batchwise or otherwise in known manner) to remove or absorb from the film forming binder material the smaller or otherwise undesirably reactive molecules or components therein.

Regarding proportioning of the solid particle material and the binder in coating compositions according to this invention, satisfactory results have been achieved with ratios of solid particles to binder material ranging approximately from 2-to-1 up to 25-to-1 by weight, with ratios of at least approximately 3-to-1 and up to 6-to-1 or 8-to-1 being preferred. When the teachings hereof are being used for applications requiring primarily electrophotosensitive characteristics, it may be noted that the lower ratios mentioned may be satisfactory where a high intensity ultra-violet flash is used for the photographic exposure to give deep immediate penetration of the light into the dried film layer, whereas higher ratios may give better results with a less intense incandescent light source. Also, particularly in applications where the water is insolubility or hydrophilic or other characteristics of the final product are of importance, it has been noted that such characteristics of the final dried film appear to improve with increased solids content, and so the higher ratios of dispersed solid particles to film forming binder are preferred—i.e., ratios of 6-to-1 or up to 12-to-1. If, however, the proportion of the dispersed solid particles is raised substantially above approximately a 25-to-1 ratio with respect to the binder material, there may be so much of the solid component present that the film forming characteristics of the binder may be interrupted to an extent where the desired continuous matrix film or layer will not be formed or firmly bonded to the surface being coated.

Where the desired use of the coated surface is in connection with lithography, it has been found that some lithographic inks contain dyes which may have a tendency to affect the solid component particles, particularly zinc oxide, in the finished coating matrix to increase the likelihood of undesirable ink pick-up on non-image areas of the coated plates or press parts after prolonged use. In such cases, of course, lower ratios of solid particle to binder (e.g., 3-to-1 or 4-to-1) may be preferred; although, with other types of lithographic inks commonly in use, the hydrophilic character of the finished coating matrix is improved at the higher ratios. Similarly it has been found that, when providing coatings of this invention to form a surface layer of a lithographic plate over which a different photosensitive image layer is to be applied and then removed, the tenacity of adherence (or the difficulty of removal) of different conventional sensitizing emulsions (i.e., diazo, albumen, silver halide, etc.) may vary somewhat according to the proportion of solid particle component in the surface coating on the plate so that a different particle-to-binder ratio may be preferred for one type of sensitizing coating than would be preferred for another type of sensitizing coating, but all within the ranges disclosed above.

As will be understood, the viscosities of the coating materials may be varied over a wide range as may be desired depending upon the manner in which the coating materials are to be applied and the surface to be coated. The resulting dispersions are satisfactorily coated by any of the conventional coating techniques such as dipping, brushing, roll coating, etc., the particular one of which being selected with regard to the shape and character and properties of the surface being coated, and with the viscosity of the coating material being controlled by the addition of more or less water according to the requirements of the coating technique employed. The applied coatings are then dried and heat treated, as noted, to remove the water vehicle and to volatilize such neutralizing or solubilizing agent as may be present, and such drying is satisfactorily accomplished in a conventional drying oven or other apparatus such as a source of infra-red heat, vacuum oven, or other known manner which will dry and de-gas the coating satisfactorily.

With some applications, particularly those in which the importance of the electrical characteristics of the coating are significant, it may be desired to apply an additional coating of binder material solution alone over the top of the dried matrix film for the purpose of producing a smooth or continuous top surface over any of the discrete solid particles which may protrude upwardly out of the dried film. That is, even a microscopically rough or non-homogeneous top surface may provide conduction paths for the inadvertent leakage or discharge of an electrostatic charge impressed upon the surface of the coating.

A thin extra film of binder material applied over the dried coating, although not always necessary even for electrophotographic uses, may assure a continuous or smooth top surface, as well as continuous insulation of any upwardly protruding solid particles both electrically and from contact with moisture. After application of such a top surface film, however, it is preferred that any excess binding material be washed away so that the top surface of the finished article does not contain water soluble binding material which has not reacted with any particles present in order to maintain the water insolubility of the finished and dried coating to the degree desired.

As noted, each of the various coatings in accordance with this invention may not be equally applicable to every use, and the illustrative examples set forth above are to be considered as illustrating a variety of coating compositions embodying and for practising this invention for various purposes. For example, the highest degrees of water insolubility, hydrophilic properties, heat and erosion resistance, etc., are achieved, among the foregoing examples, with the formulations embodying polyacrylic acid resin and zinc oxide (e.g., Examples I–III and V), which formulations also produce satisfactory or preferred electrophotosensitive characteristics for use in electrophotography. The formulation of Example IV illustrates a type of composition which, although producing substantially less final water resistance or insolubility than the composition of Example I, achieves satisfactory electrophotosensitive characteristics and may be found, perhaps, to be somewhat more readily handled and applied as a coating than that of Example I.

The other Examples illustrate various formulations, all of which give satisfactory results as electrophotosensitive coatings for electrophotography, utilizing various other illustrative binder materials and/or photoconductive solid particle components. Although these examples, either because of using a different resin or because of using a different solid particle component, may exhibit substantially less final water insolubility or water resistance than a formulation such as Example I, the finished and dried coatings are sufficiently water insoluble for the purposes of electrophotography, even if not of such high degree of insolubility or hydrophilic properties as would be desired for a protective coating against steam erosion or a lithographic coating which must be wetted and scrubbed with a water fountain solution each time a printing impression is made for, perhaps, many thousands of impressions.

In this connection it should also be noted that all varieties of solid particle materials or components noted, such as zinc oxide particles, may not be photoconductive to a degree desired for applications of this invention to electrophotography. Whether such differences among commercially available varieties of zinc oxide particles are due to the inclusion of impurities or to particle size or to other factors may not now be known with certainty. According to the instructions noted above, however, a satisfactorily electrophotoconductive zinc oxide can readily be selected for applications of this invention to electrophotography. For other applications of this invention where the characteristic of electrophotoconductivity of the zinc oxide particles is not of utmost importance, satisfactory water insolubility and hydrophilic and other characteristics of the coatings embodying this invention are achieved with solid inorganic particle components in accordance herewith which may not be highly photoconductive.

It will, accordingly, be seen that there are provided in accordance with this invention coating compositions and methods and coated products for imparting a surface protective or conditioning coating film or layer to a wide variety of articles of various materials for imparting to the surface thereof a wide variety of useful characteristics, and that such coatings are all applied from a water solution of a synthetic film forming polymer binder material having dispersed therein a solid discrete inorganic particle phase to form on the coated surface a dried film or layer matrix of solid discrete particles in the binder material to provide, as coated and dried and substantially without subsequent treatment, the surface characteristics desired.

It should also be noted that, although the foregoing description of this invention is set forth in connection with fluid material being coated on a surface as a layer adherent thereto, the invention is also to be understood as applicable to the formation of a self-sustaining film or sheet of such compositions, and the words "coating," "film," and "layer" as used herein are to be understood to include both a thin coating applied and adhered to another surface as well as a separate and self-sustaining sheet or other form. Although applied originally from a water solution of a water soluble resin, compositions are provided in accordance herewith such that certain of the dried coatings are substantially water insoluble while, at the same time being quite hydrophilic or water receptive. Even so, such coatings can be removed or dissolved, if desired, merely by washing with a strong alkali. Although some of the coatings in accordance herewith may be attacked to some extent by mineral acids, the water insoluble coatings are also substantially insoluble in organic solvents, yet have been found to form a surface to which various organic film forming and binding agents will readily and tenaciously adhere for applying additional coating materials thereover.

While the processes and products and compositions herein described constitute preferred embodiments of this invention, it is to be understood that the invention is not limited to these precise processes and products and compositions and that changes may be made therein without departing from the scope of the invention which is defined in the appended claims.

What is claimed is:

1. An element of a lithographic printing press at least part of the surface of which is subjected in use to repeated contact with a water fountain solution, said element carrying on the surface thereof a dried substantially continuous hydrophilic surface-conditioning coating insoluble in water and consisting essentially of a matrix of polyacrylic acid resin film forming material and finely divided zinc oxide as an insolubilizing component therefor, said zinc oxide being present in a proportion by weight of at least twice that of said polyacrylic acid resin, and said matrix coating being otherwise free of inert mineral filler.

2. An element of a lithographic printing press at least part of the surface of which is subjected in use to repeated contact with a water fountain solution, said element carrying on the surface thereof a dried substantially continuous hydrophilic surface-conditioning coating insoluble in water and consisting essentially of a matrix of polyacrylic acid resin film forming material and finely divided zinc oxide as an insolubilizing component therefor, said zinc oxide being present in a proportion by weight of at least 2 to 25 times that of said polyacrylic acid resin, and said matrix coating being otherwise free of inert mineral filler.

3. An element of a lithographic printing press at least part of the surface of which is subjected in use to repeated contact with a water fountain solution, said element carrying on the surface thereof a dried substantially continuous hydrophilic surface-conditioning coating insoluble in water and consisting essentially of a matrix of polyacrylic acid resin film forming material and finely divided zinc oxide as an insolubilizing component therefor, said zinc oxide being present in a proportion by weight of at least 6 to 12 times that of said polyacrylic acid resin, and said matrix coating being otherwise free of inert mineral filler.

4. An element of a lithographic printing press at least part of the surface of which is subjected in use to repeated contact with a water fountain solution, said element carrying on the surface thereof a dried substantially continuous hydrophilic surface-conditioning coating insoluble in water and consisting essentially of a matrix of acrylic acid polymer film forming material and finely divided zinc oxide as an insolubilizing component therefor, said zinc oxide being present in a proportion by weight of at least 2 to 25 times said acrylic acid polymer, and said coating being otherwise substantially free of inert mineral filler.

5. An element of a lithographic printing press at least part of the surface of which is subjected in use to repeated contact with a water fountain solution, said element carrying on the surface thereof a dried substantially continuous hydrophilic surface-conditioning coating insoluble in water and consisting essentially of a matrix of acrylic acid polymer film forming material and finely divided zinc oxide as an insolubilizing component therefor, said zinc oxide being present in a proportion by weight of at least 2 to 25 times said acrylic acid polymer, said coating being otherwise substantially free of inert mineral filler, and said coating including an additive conditioning material for enhancing and controlling the water receptivity of the surface of said coating matrix.

6. An article carrying on the surface thereof a protective corrosion- and abrasion-resistant coating of a water insoluble matrix of finely divided zinc oxide particles uniformly dispersed in a film of polyacrylic acid resin bonded to said article, said water-insolubility and corrosion- and abrasion-resistance being attributable to a reaction product of said polyacrylic acid resin film and said zinc oxide particles distributed therein, said zinc oxide particles being present in said film in a proportion more than twice the weight of said polyacrylic acid.

7. A coating material composition consisting of a water solution of polyacrylic acid resin, a volatilizable alkaline material for neutralizing said polyacrylic acid solution, and finely divided zinc oxide particles dispersed in said neutralized polyacrylic acid solution, said zinc oxide being present in a proportion by weight of at least twice the weight of said polyacrylic resin, and said coating composition being adapted to form when coated and dried on a surface, a coating layer thereover of a water insoluble and abrasion and corrosion resistant matrix of zinc oxide particles in a polyacrylic acid film.

8. A coating material composition as recited in claim 7 in which said volatilizable alkaline material is ammonium hydroxide.

9. A coating material composition as recited in claim 7 in which said zinc oxide is present in a proportion by weight of about 2 to 25 times said polyacrylic acid resin.

10. A coating material composition as recited in claim 7 in which said zinc oxide is present in a proportion by weight of about 6 to 8 times said polyacrylic acid resin.

11. A coating composition for application to the surface of an image carrier base for use in an electrophotographic process to form over said surface an electrophotoconductive film and comprising an aqueous solution of an organic polymeric electrolyte including functional groups selected from the class consisting of esters, hydroxyl and carboxyl groups present in an amount sufficient to render the polymeric electrolyte soluble in an aqueous solution of a solubilizing reactant, a volatilizable solubilizing reactant for maintaining said polymeric electrolyte aqueous soluble at least so long as said reactant is present in said solution, said polymeric electrolyte including a relatively high proportion of non-polar groups for forming an electrically insulating film upon removal of said reactant and upon drying on said base, and a finely divided solid aqueous insoluble photoconductor material uniformly dispersed in said solution of said polymeric electrolyte, said photoconductor material being present in an amount at least above approximately twice by weight of said polymeric electrolyte, said coating composition forming an electrically insulating photoconductive layer when deposited on a base member and dried thereon.

12. A coating composition for application to the surface of an image carrier base for use in an electrophotographic process to form over said surface an electrophotoconductive film and comprising an aqueous solution of an organic polymeric electrolyte including functional groups ionizable in a water solution containing an electrolyte and being aqueous soluble in an aqueous solution of an alkaline pH and aqueous insoluble at an acid pH, a volatilizable solubilizing reactant for maintaining said polymeric electrolyte aqueous soluble at least so long as said reactant is present in said solution, said polymeric electrolyte including a relatively high proportion of non-polar groups for forming an electrically insulating film upon removal of said reactant and upon drying on said base, and a finely divided solid aqueous insoluble photoconductor material uniformly dispersed in said solution of said polymeric electrolyte, said photoconductor material being present in an amount between approximately twice to twenty-five times the weight of said polymeric electrolyte, said coating composition being substantially free of low molecular weight charge carriers other than said reactant for forming an electrically insulating photoconductive layer when deposited on a base member and dried thereon.

13. A coating composition for application to the surface of an image carrier base for use in an electrophotographic process to form over said surface an electrophotoconductive film and comprising an aqueous solution of an organic polymeric electrolyte selected from the class consisting of water soluble acrylic and methacrylic acid, ester and amide polymers and copolymers, polyvinyl esters and acid and acid anhydride modifications thereof, and mixtures thereof, a volatilizable solubilizing reactant for maintaining said polymeric electrolyte aqueous soluble at least so long as said reactant is present in said solution, and a finely divided solid aqueous insoluble inorganic photoconductor material uniformly dispersed in said solution of said polymeric electrolyte, said photoconductor material being present in an amount at least approximately twice by weight of said polymeric electrolyte, said coating composition being substantially free of low molecular weight charge carriers other than said reactant for forming an electrically insulating photoconductive layer when deposited on a base member and dried thereon.

14. A coating composition for application to the surface of an image carrier base for use in an electrophotographic process to form over said surface an electrophotoconductive film and comprising an aqueous solution of an organic polymeric electrolyte including functional groups consisting essentially of carboxyl groups present in an amount sufficient to render the polymeric electrolyte soluble in an aqueous solution of a solubilizing reactant, a volatilizable solubilizing reactant for maintaining said polymeric electrolyte aqueous soluble at least so long as said reactant is present in said solution, said polymeric electrolyte including a relatively high proportion of non-polar groups for forming an electrically insulating film upon removal of said reactant and upon drying on said base, a finely divided solid aqueous insoluble inorganic photoconductor material uniformly dispersed in said solution of said polymeric electrolyte, said photoconductor material being present in an amount between approximately twice to twenty-five times the weight of said polymeric electrolyte, said coating composition being substantially free of low molecular weight organic and inorganic charge carriers other than said reactant for forming an electrically insulating photoconductive layer when deposited on a base member and dried thereon.

15. A printing plate adapted for offset lithography and having a photoconductive film thereon adapted to receive an image electrophotographically, said film comprising a water insoluble, hydrophilic, electrically insulating organic polymeric film forming binder including functional groups consisting essentially of carboxyl groups present in an amount sufficient to render the binder initially soluble in an aqueous solution of a solubilizing reactant and finely divided uniformly dispersed photoconductor particles in said film forming binder, the surface of said film being adapted to receive an oleophilic developing material in image areas of said print and being permanently hydrophilic in the non-image areas thereof, and said photoconductor particles being present in said film in an amount from six to twelve times the weight of said film forming binder.

16. An electrophotographic printing plate for use in printing multiple ink impressions of an image on paper and the like by offset lithography and wherein said image to be lithographically printed by said plate is originally impressed thereon by electrophotography comprising a base member having on a surface thereof a photoconductive electrically insulating layer adapted to receive electrophotographically an electrostatic charge image conforming to the image to be lithographically printed by said plate, said photoconductive insulating layer comprising a water-insoluble and hydrophilic matrix of solid particles of photoconductive material dispersed in a synthetic resin binder consisting essentially of a reaction product of said photoconductive material and a water-soluble polymer of an ethylenically unsaturated monomer, said polymer including carboxylic acid functional groups, said photoconductive material being present in said water-insoluble and hydrophilic matrix in an amount by weight of at least twice the weight of said polymer, and the exposed surface of said photoconductive insulating layer matrix having thereon oleophilic ink receptive areas in image configuration for receiving a lithographic ink, and the areas of said plate other than said oleophilic areas being sufficiently permanently hydrophilic and capable of direct use in lithographic printing substantially without further treatment.

17. A printing plate as set forth in claim 16 wherein said film forming polymer is a copolymer of vinyl acetate and crotonic acid.

18. An electrophotographic printing plate adapted for use in printing multiple ink impressions of an image on paper and the like by offset lithography and wherein said image to be lithographically printed by said plate is originally impressed thereon by electrophotography comprising a base having on a surface thereof a photoconductive electrically insulating layer adapted to receive electrophotographically an electrostatic charge image conforming to the image to be lithographically printed by said plate, said photoconductive electrically insulating layer comprising a water-insoluble and hydrophilic matrix of solid particles of a photoconductive material dispersed in a resin binder consisting essentially of a reaction product of said photoconductive material and an acrylic acid polymer, said photoconductive material being present in said water insoluble and hydrophilic matrix in an amount by weight of at least twice the weight of said polymer, and the exposed surface of said photoconductive insulating layer matrix being adapted to receive an oleophilic electrostatic developing material for said electrostatic charge image and also being sufficiently permanently hydrophilic and capable of direct use in lithographic printing without further treatment.

19. A printing plate as recited in claim 18 in which said solid particles of photoconductive material are selected from the group consisting of photoconductive zinc oxide, titanium dioxide, zinc sulfide and mixtures thereof.

20. A printing plate as recited in claim 18 in which said photoconductive material is present in said matrix layer in an amount by weight of about 6 to 8 times the weight of said polymer.

21. A printing plate as set forth in claim 16 in which said film forming polymer is polyacrylic acid and said photoconductive material is photoconductive zinc oxide.

22. In a process for preparing an electrophotographic printing plate for use on a lithographic printing press wherein said plate includes a photoconductive insulating layer on a surface thereof adapted to receive an electrostatic charge image conforming to the image to be lithographically printed by said plate, the photoconductive insulating layer including a water-insoluble and hydrophilic matrix of solid particles of a photoconductive material dispersed in a resin binder consisting essentially of a reaction product of said photoconductive material and a water-soluble film forming polymer of an ethylenically unsaturated carboxylic acid monomer, said photoconductive material being present in said water-insoluble and hydrophilic matrix in an amount by weight of at least twice the weight of said polymer, the steps which comprise forming an electrostatic latent image on a layer of said plate, developing said image with a developer to provide a plate having thereon an image corresponding to the image to be lithographically printed by said plate, said layer being sufficiently permanently hydrophilic in the areas other than those developed for use in lithographic printing substantially without further treatment, and applying to said plate a lithographic ink which adheres to said plate in the image areas thereof.

23. A process as set forth in claim 22 in which the photoconductive particles are present in a dry film in an amount from 2 to 25 times the weight of said polymer.

24. A process as recited in claim 22 in which the photoconductive particles are present in said dry film in an amount from 6 to 8 times the weight of said polymer.

25. A process as set forth in claim 22 in which said polymer is an acrylic acid polymer and said photoconductive particles are photoconductive zinc oxide.

26. An electrophotographic printing plate for use in printing multiple ink impressions of an image by offset lithography wherein the image to be lithographically printed by said plate is originally impressed thereon by electrophotography, said printing plate having on a surface thereof a photoconductive insulating layer adapted to receive electrophotographically an electrostatic charge image conforming to said image to be lithographically printed by said plate, said photoconductive insulating layer comprising a water-insoluble and hydrophilic matrix of solid particles of a photoconductive zinc oxide dispersed in a resin binder consisting essentially of a reaction product of said photoconductive zinc oxide and a polymeric material, said polymeric material being selected from the group consisting of polyacrylic acid and methylacrylic acid/vinyl acetate copolymers, said photoconductive zinc oxide being present in said water-soluble and hydrophilic matrix in an amount by weight of at least twice the weight of said polymeric material, the exposed surface of said photoconductive insulating layer matrix having thereon an oleophilic ink receptive material in the image areas thereof, and the areas other than said oleophilic ink receptive areas being sufficiently permanently hydrophilic and capable of direct use in lithographic printing without further treatment.

References Cited
UNITED STATES PATENTS

| | | | |
|---|---|---|---|
| 3,471,625 | 10/1969 | Adams et al. | 96—1.8 |
| 2,966,480 | 12/1960 | Wechsler et al. | 260—85.7 |
| 2,199,557 | 5/1940 | Charlton | 260—41 |
| 2,356,879 | 8/1944 | Pense et al. | 260—29.6 |
| 2,577,624 | 12/1951 | Niles | 260—41 |
| 2,661,309 | 12/1953 | Azorlosa | 117 |
| 2,790,735 | 4/1957 | McLaughlin et al. | 260—41 |
| 2,251,296 | 8/1941 | Shipp | 260—91.3 |
| 2,287,161 | 6/1942 | Ball | 260—29.6 |
| 2,760,431 | 8/1956 | Beatty | 96—75 |
| 2,862,815 | 12/1958 | Sugarman et al. | 96—1 |
| 2,901,348 | 8/1959 | Dessauer et al. | 96—1 |
| 1,976,679 | 10/1934 | Fikentscher et al. | 260—29 |
| 2,692,826 | 10/1954 | Neugebauer et al. | 260—33 |
| 2,875,054 | 2/1959 | Griggs et al. | 96—1 |
| 2,883,298 | 4/1959 | Meadows | 260—29.6 |
| 2,937,085 | 5/1960 | Seven et al. | 96—33 |
| 2,983,220 | 5/1961 | Dalton et al. | 96—33 |
| 2,993,787 | 7/1961 | Sugarman | 96—1 |
| 2,990,279 | 6/1961 | Crumley et al. | 96—1 |
| 2,663,636 | 12/1953 | Middleton. | |
| 2,753,278 | 4/1951 | Bixby | 117—200 |

(Other references on following page)

UNITED STATES PATENTS

| | | | |
|---|---|---|---|
| 3,128,204 | 4/1964 | Schaum et al. | 117—221 |
| 3,052,539 | 9/1962 | Greig | 96—1 |
| 3,121,006 | 2/1964 | Middleton et al. | 96—1 |
| 2,735,784 | 2/1956 | Greig et al. | 117—155 |
| 2,806,020 | 9/1957 | Scott et al. | 260—85.7 |

FOREIGN PATENTS

| | | | |
|---|---|---|---|
| 576,729 | 5/1959 | Canada | 96—1 |
| 951,496 | 4/1949 | France | 260—29.6 |
| 204,093 | 10/1956 | Australia | 96—1 |
| 543,624 | 12/1955 | Belgium. | |

OTHER REFERENCES

Schildknecht, Vinyl and Related Polymers, Wiley (1952), pp. 398–402.

Kearns (Thesis), "Electrical Properties of Organic Solids" University of California, Lawrence Radiation Laboratory, Contract No. W-7405-eng-48, UCRL-9120 UC-4 Chemistry, TID-4500 (15th Ed.), page 7 (1960).

CHARLES E. VAN HORN, Primary Examiner

U.S. Cl. X.R.

96—1 R, 1.5; 101—457, 462, 463; 117—17.5, 132 R, 161 R; 260—29.6 M, 41 B; 252—389, 501